US007107407B2

(12) United States Patent
Kato et al.

(10) Patent No.: US 7,107,407 B2
(45) Date of Patent: Sep. 12, 2006

(54) ARITHMETIC UNIT WITH REDUCED STARTUP TIME AND METHOD OF LOADING DATA

(75) Inventors: Shinsuke Kato, Kobe (JP); Kiyoshi Owada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 412 days.

(21) Appl. No.: 10/680,128

(22) Filed: Oct. 8, 2003

(65) Prior Publication Data

US 2004/0073761 A1    Apr. 15, 2004

(30) Foreign Application Priority Data

Oct. 9, 2002  (JP) ............................. 2002-296229

(51) Int. Cl.
*G06F 12/08* (2006.01)
(52) U.S. Cl. .................. 711/138; 711/117; 711/118; 708/490; 709/239; 710/38
(58) Field of Classification Search .............. None
See application file for complete search history.

(56) References Cited

U.S. PATENT DOCUMENTS

| 5,701,506 | A | | 12/1997 | Hosotani | |
|---|---|---|---|---|---|
| 5,809,531 | A | * | 9/1998 | Brabandt | ...................... 711/141 |
| 5,832,263 | A | * | 11/1998 | Hansen et al. | .............. 719/322 |
| 6,038,635 | A | * | 3/2000 | Ideta | ........................... 711/103 |
| 6,330,667 | B1 | * | 12/2001 | Klein | ............................. 713/1 |
| 6,421,776 | B1 | * | 7/2002 | Hillis et al. | ..................... 713/2 |
| 6,604,195 | B1 | * | 8/2003 | Kumar et al. | ................... 713/2 |
| 6,868,472 | B1 | * | 3/2005 | Miyake et al. | ................. 711/3 |
| 2003/0023812 | A1 | | 1/2003 | Nalawadi et al. | |
| 2003/0163681 | A1 | * | 8/2003 | Mann et al. | .................... 713/2 |
| 2003/0199093 | A1 | * | 10/2003 | Finer et al. | ................ 435/456 |
| 2004/0031031 | A1 | * | 2/2004 | Rudelic | ...................... 717/175 |

FOREIGN PATENT DOCUMENTS

JP        5-242057        9/1993
JP      08305634 A    * 11/1996

OTHER PUBLICATIONS

"Method of Testing Personal Computer Using a Static Random Access Memory". IBM Technical Disclosure Bulletin, IBM Corp., New York. vol. 37, No. 7, Jul. 1994, pp. 107-108.

* cited by examiner

*Primary Examiner*—B. James Peikari
(74) *Attorney, Agent, or Firm*—Wenderoth, Lind & Ponack, L.L.P.

(57) ABSTRACT

An arithmetic unit includes a switching device 16 and a cache controller 19. The switching device 16 determines whether desired data to be read by the CPU 11 is in a RAM 14, and allows, depending on a result of the determination, the CPU 11 to directly read the desired data from a ROM 13. The cache controller 19 controls a cache 12 so that the RAM 14 is initialized based on cache data corresponding to the desired data stored in the cache 12. In an arithmetic unit having a CPU, a cache, RAM, and ROM configured in the above manner, the time required for a startup process is reduced.

6 Claims, 3 Drawing Sheets

ARITHMETIC UNIT WITH REDUCED STARTUP TIME AND METHOD OF LOADING DATA

BACKGROUND OF THE INVENTION

1. Field of the Invention

The present invention relates to an arithmetic unit with a reduced startup time. More particularly, the present invention relates to a data loading process in an arithmetic unit comprising a Central Processing Unit (CPU).

2. Description of the Background Art

Conventionally, in an arithmetic unit comprising a CPU, a cache, RAM, and ROM, the CPU accesses desired data by reading it from the cache if the desired data is in the cache, or by reading it from the RAM if the desired data is not in the cache but in the RAM. If the desired data is not in either the cache or RAM, the CPU copies the desired data from the ROM to RAM, and then reads the data from the RAM (see, for example, page 2, FIG. 1 of Japanese Laid-Open Patent Publication No. 05-242057).

FIG. 3 is a flowchart showing a startup process for an operating system (OS).

When the system startup process is initiated by turning on the power (S101), the CPU designates, in order to read desired data, an address associated with the data (S102), and then determines sequentially whether the data is in the cache or RAM by checking these two elements in this order (S103 and S105). If the desired data is in the cache, the CPU reads it from the cache (S104). If the desired data is not in the cache but in the RAM, the CPU reads it from the RAM (S108).

If the desired data is not in either the cache or RAM, the CPU starts copying necessary data (which at least includes desired data) from the ROM to RAM (S106), and waits for the copy to complete (S107). Upon completion of the copy, the CPU reads the desired data from the RAM (S108). The CPU then processes the read data (S109).

There is no data left in a volatile memory, such as a cache or RAM, at the time of the startup process, and therefore a conventional system requires that RAM be initialized (as used herein, "initialization" means writing data necessary for the startup process to the RAM) by copying data from the ROM to the RAM every time the system is started. After the initialization of the RAM, the CPU performs the startup process by reading data necessary for the startup process, from the RAM. In other words, in a conventional system, the CPU is unable to proceed with the startup process until the copying of data from the ROM to the RAM is complete, and consequently, the startup process requires a considerable amount of time.

It might be possible to temporarily save, at the time of suspend, data in the RAM in a non-volatile memory and write back the data to the RAM when resuming from a suspended state. However, in this case too, the same problem as that associated with the startup process occurs. That is, until the data saved in the non-volatile memory has been written back to the RAM, the CPU is unable to perform any process using such data.

SUMMARY OF THE INVENTION

Therefore, an object of the present invention is to reduce the time required for a startup process and the time required for a resume process from suspend, in an arithmetic unit comprising a CPU, a cache, RAM, and a non-volatile memory.

The present invention has the following features to attain the object mentioned above. An aspect of the present invention is directed to an arithmetic unit with a reduced startup time comprising determination means, a switching device, and a cache controller. The determination means determines whether desired data to be read by a CPU is in RAM. Depending on a result of the determination by the determination means, the switching device allows the CPU to directly read desired data from a non-volatile memory. The cache controller controls a cache so that the RAM is initialized based on cache data stored in the cache corresponding to the desired data.

According to this aspect of the present invention, at the time of a startup or at the time of resuming from a suspended state, the CPU can directly obtain data necessary for the startup process from the non-volatile memory and then immediately start the process without the need to wait until a copy of data from a non-volatile memory to RAM is complete. Therefore, the time required for a startup process or a resume process from suspend can be reduced.

Moreover, because the RAM is initialized based on cache data corresponding to data which has been directly read by the CPU from the non-volatile memory, the loading time is reduced at times when the data having been directly read from the non-volatile memory is accessed again. Accordingly, not only the time required for a startup process or a resume process from suspend can be reduced, but also the time required for processes that follow the startup process or the resume process can be reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is described below.

Figure 1:
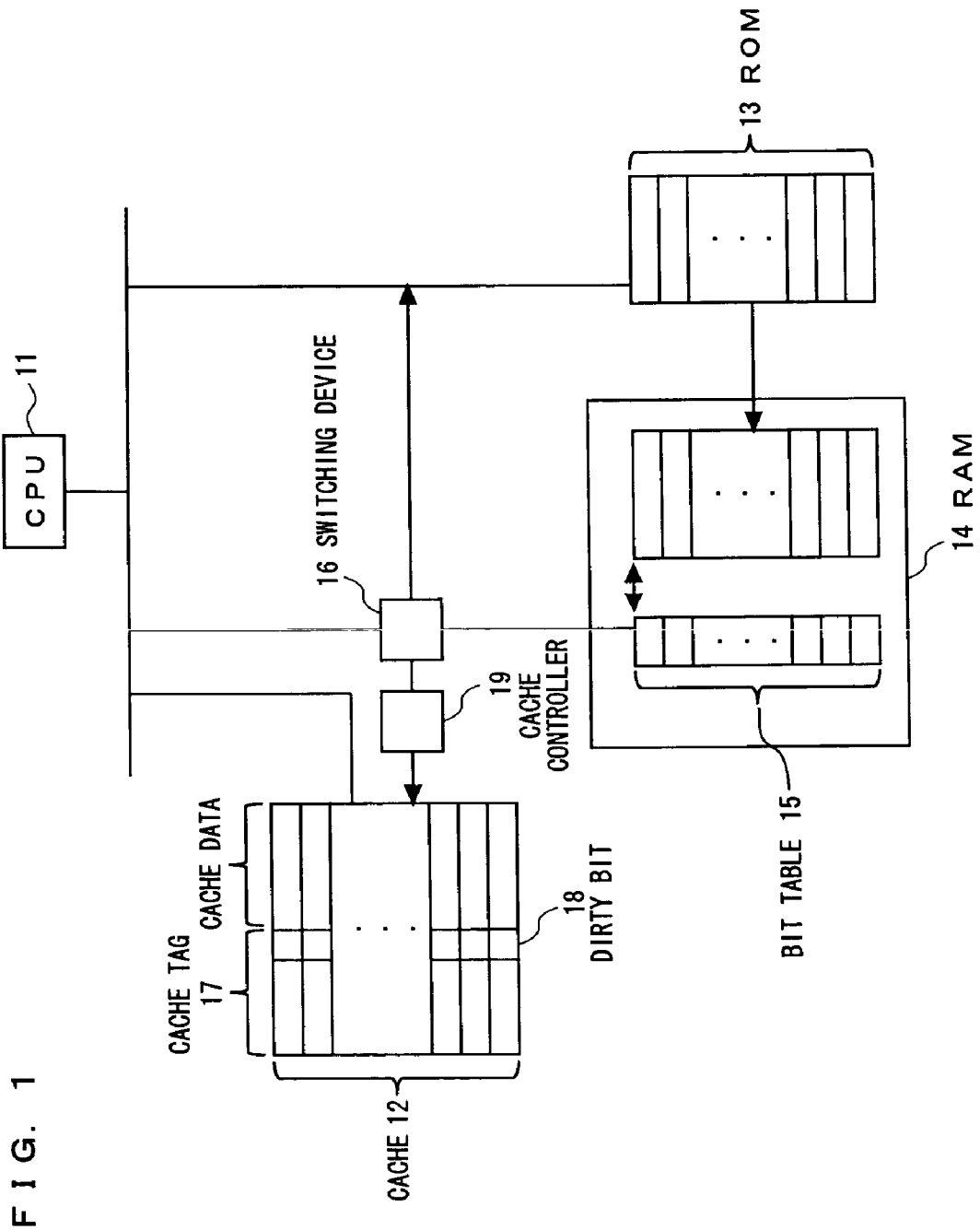
FIG. 1 is a block diagram showing the configuration of an arithmetic unit according to an embodiment of the present invention.

FIG. 1 is a block diagram showing the configuration of an arithmetic unit according to an embodiment of the present invention. The arithmetic unit includes a CPU 11, a cache 12, a ROM 13, a RAM 14, a switching device 16, and a cache controller 19. These constituent elements are connected to one another by, for example, a bus.

First, the roles of the constituent elements at the time of a startup are described.

In order to perform a startup process, the CPU 11 accesses data for a startup process. This access is performed by issuing an address in the RAM 14.

The cache 12 is a volatile memory such that any data held therein is lost when the power is turned off. The cache 12 is generally smaller in storage capacity than the RAM 14, but has a faster access rate than the RAM 14. The data read by the CPU 11 from the RAM 14, etc., is temporarily stored in the cache 12, and the CPU 11 first accesses the cache when obtaining data.

The cache 12 holds cache tags 17 associated with cache data, which is temporarily-held data. The cache tag 17 includes a dirty bit for indicating whether cache data has been updated or not. When data at a given address in the RAM 14 is stored to the cache 12 as cache data, the address in the RAM 14 is stored in a cache tag 17 associated with such cache data. In addition, when this cache data is updated by the CPU 11, the dirty bit 18 of the cache tag 17 associated with the cache data is set to "dirty". When replacing data in the cache 12, an update performed on cache data needs to be reflected on the original data in the RAM 14. To this end, for any piece of cache data whose dirty bit 18 is set to "dirty", the CPU 11 rewrites the data at the address in the RAM 14 as indicated by the cache tag 17, with the updated cache data.

The ROM 13 has a slower access rate than the RAM 14, but because the ROM 13 is a non-volatile memory which is capable of holding data even when the power is turned off, the ROM 13 is used to retain data necessary for a startup process. In the present embodiment, data necessary for the startup process which is held in the ROM 13 is directly provided to the CPU 11 by the function of the switching device 16 without having to be first copied to the RAM 14, as will be described later.

The RAM 14 is a volatile memory such that data held therein is lost when the power is turned off, and generally has a greater storage capacity than the cache 12. In addition, the access rate of the RAM 14 is slower than that of the cache 12 and faster than that of the ROM 13. When the CPU 11 processes data, a part of the data is copied from the ROM 13 to the RAM 14, and the CPU 11 accesses the data having been copied to the RAM 14. Note that since there is no data held in the RAM 14 at the time of a system startup, the initialization of the RAM 14 (i.e., data necessary for the startup process is written to the RAM) is required, and thus data necessary for the startup process is copied from the ROM 13 to the RAM 14.

A RAM data determination bit table 15 is held in the RAM 14 to determine whether data is held in the RAM 14. One bit of the RAM data determination bit table 15 (hereinafter referred to as a "RAM data determination bit") corresponds to every 32 bytes of the memory area of the RAM 14. If no data is held in an associated memory area of the RAM 14, the RAM data determination bit is "0". Once data is written to such an area, the RAM data determination bit is changed to "1". At the time of a system startup, no data is held in the RAM 14, and therefore all bits of the RAM data determination bit table 15 are "0". By referring to the RAM data determination bit table 15, whether data is held in the RAM 14 or not can be instantaneously determined.

When the CPU 11 attempts to access a given address in the RAM 14, the switching device 16 determines, by referring to the RAM data determination bit table 15, whether data is present at the address in the RAM 14 designated by the CPU 11. If any data is present, the switching device 16 allows the CPU 11 to read the data from the RAM 14. If no data is present, the switching device 16 allows the CPU 11 to directly read the data in the ROM 13 associated with the address in the RAM 14 designated by the CPU 11. In the case where the address in the RAM 14 designated by the CPU 11 is not identical to an address in the ROM 13 at which data associated with the address in the RAM 14 is stored, the switching device 16 may determine an address in the ROM 13 that corresponds to the address in the RAM 14 designated by the CPU 11 and allow the CPU 11 to access this address in the ROM 13. The data that is directly read by the CPU 11 from the ROM 13 is temporally held in the cache 12.

If the switching device 16 has allowed the CPU 11 to directly read data from the ROM 13, the cache controller 19 controls a cache tag 17 in the cache 12 as follows. Specifically, the cache controller 19 registers in a cache tag 17 the address in the RAM 14 that the CPU 11 originally intended to access, and also sets a dirty bit 18 of the cache tag 17 to "dirty". This function of the cache controller 19 and the mechanism of the cache 12 together realize an initialization of the RAM 14 as described below.

The principle of the initialization of the RAM 14 of the present embodiment is specifically described. In a conventional system, the initialization of the RAM 14 is performed by copying data necessary for a startup process from the ROM 13 to the RAM 14. On the other hand, in the present embodiment, because data necessary for a startup process is read directly by the CPU 11 from the ROM 13, the initialization of the RAM 14 is not performed at the time of a startup process. Meanwhile, according to the mechanism of an existing cache, when cache data is updated, the dirty bit associated with the cache data is set to "dirty". When replacing data in the cache, for any piece of cache data whose dirty bit is set to "dirty", the original data stored in the RAM is rewritten with the updated cache data. In the present embodiment, the cache controller 19 realizes an initialization of the RAM 14 by effectively utilizing the mechanism of an existing cache, through controlling the cache tag 17 in the manner described above. That is, in the present embodiment, data read directly by the CPU 11 from the ROM 13 is held in the cache 12 first, and thereafter, all such data (regardless of whether the data has actually been updated or not) is stored at their respective original addresses in the RAM 14, whereby an initialization of the RAM 14 is performed.

Figure 2:
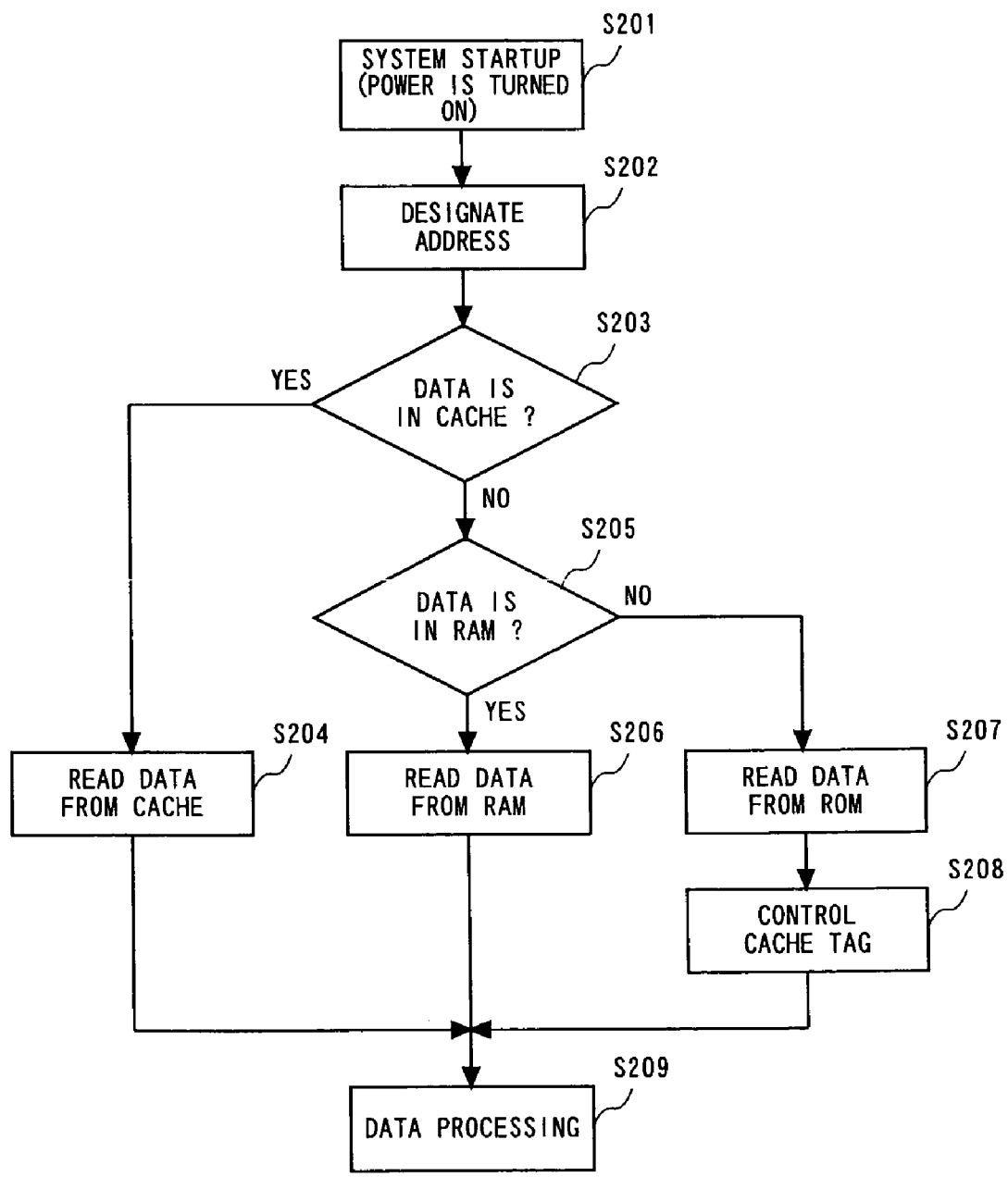
FIG. 2 is a flowchart showing the operation of the arithmetic unit according to the embodiment of the present invention.
Figure 3:
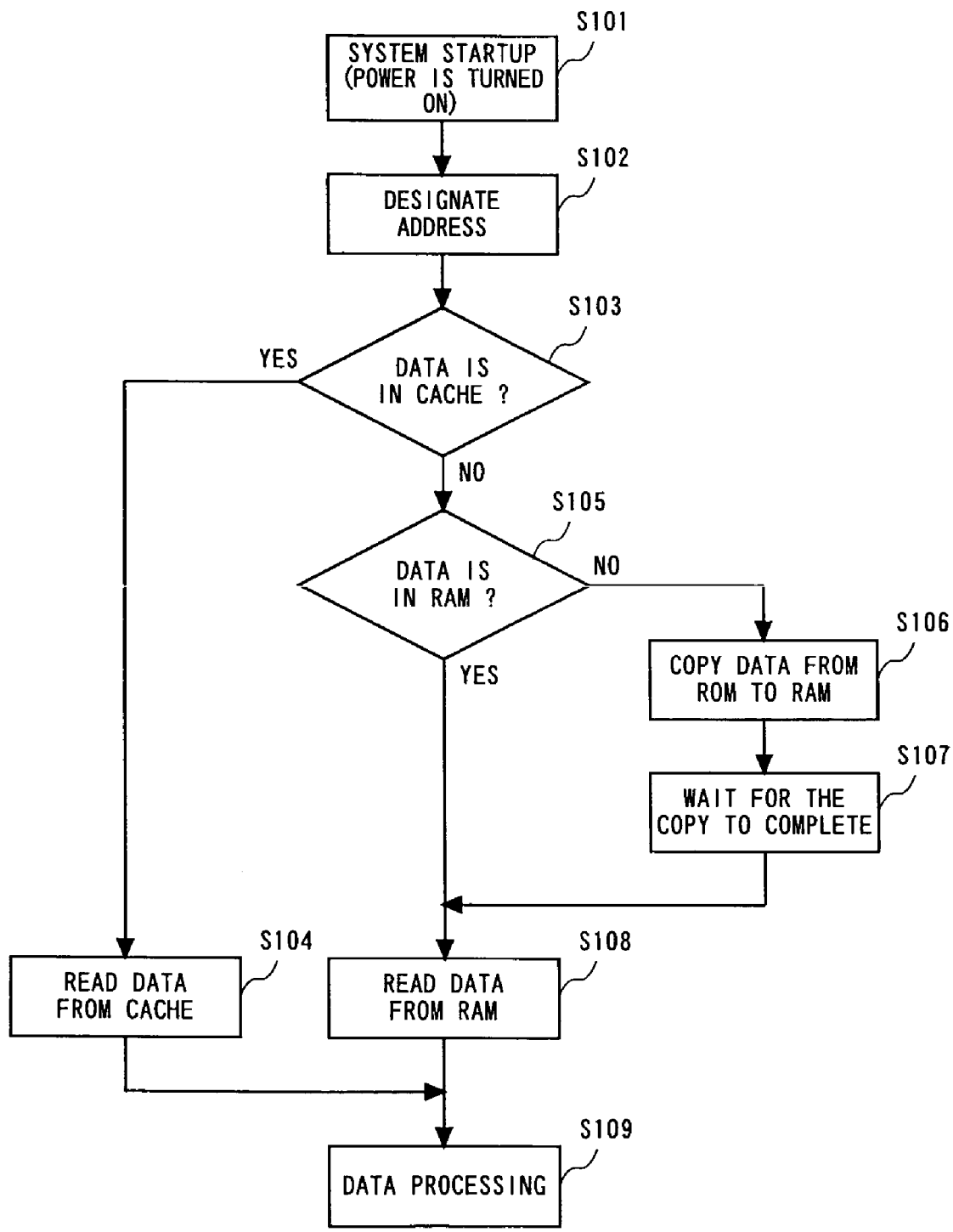
FIG. 3 is a flowchart showing the operation of a conventional system.

Next, with reference to the flowchart shown in FIG. 2, the operation of the arithmetic unit at the time of a startup is described.

When the system startup process is initiated by turning on the power (S201), the CPU 11 designates, in order to read desired data, an address associated with the desired data (S202), and then determines whether the data is in the cache 12 (S203). If the data were in the cache 12, the CPU 11 would read it (S204), but there is no data in the cache 12 at the time of a startup. Therefore, when the CPU 11 attempts to access a given address in the RAM 14, the switching device 16 determines, by referring to the RAM data determination bit table 15, whether data is present at the given address in the RAM 14 (S205). If data were present in the RAM 14, the switching device 16 would allow the CPU 11 to read it (S206), but there is no data in the RAM 14 at the time of a startup. Therefore, the switching device 16 allows the CPU 11 to directly read data from the ROM 13 instead (S207). The data read at this point is stored to the cache 12 as cache data, and therefore the cache controller 19 controls a cache tag 17 associated with such cache data stored to the cache 12 (S208). The CPU 11 then processes the read data (S209).

As described above, according to the present embodiment, because the CPU 11 is able to initiate the startup process without the need to perform, at the time of the system startup process, the process of copying data from the ROM 13 to the RAM 14, the startup time is reduced. In addition, because the data read directly by the CPU 11 from the ROM 13 is temporarily stored in the cache 12 and thereafter stored at their respective original addresses in the RAM 14, it is possible to realize an initialization of the RAM 14 and also to improve the access rate of data after the startup process.

In the above, the operation of an arithmetic unit at the time of a system startup, which is immediately after the power is turned on, is described, but the present invention can also be applied similarly at the time of starting an application program or at the time of performing a resume process from suspend. In such cases too, the process of copying data from a non-volatile memory to the RAM 14 can be omitted, and therefore it is possible to reduce the startup time of an application program and the resume time from suspend. In the case of starting an application, it is preferable to clear in advance bits of the RAM data determination bit table 15 that are associated with regions in the RAM 14 in which data of such an application is to be loaded.

Moreover, in the present embodiment, the CPU 11 performs a startup process by using data stored in the ROM 13, but the present invention is not limited thereto. The invention can also be applied to the case where the CPU 11 performs a startup process by using data stored in any non-volatile memory. For example, even if the invention is applied to the case where the CPU 11 starts an application program stored in a memory card, the same advantageous effects can be obtained.

In the present embodiment, the switching device 16 determines whether data to be read by the CPU 11 is in the RAM 14, but the present invention is not limited thereto. Means for determining whether data to be read by the CPU 11 is in the RAM 14 may be provided independently of the switching device 16. Further, means for determining whether data to be read by the CPU 11 is in the RAM 14 may be the CPU 11.

In the present embodiment, the switching device 16 determines whether data to be read by the CPU 11 is in the RAM 14, by referring to the RAM data determination bit table 15, but the determination may be made in other manners. For example, whether data is present in the RAM 14 or not may be determined by preparing and referring to a one-bit flag for indicating whether any data is written in any region in the RAM 14. Further, the CPU 11 may access the memory area of the RAM 14 in practice to determine whether data is in the RAM 14.

In the present embodiment, the initialization of the RAM 14 is realized in a manner such that the cache controller 19 controls the dirty bits 18 of the cache tags 17, but the present invention is not limited thereto. For example, the cache controller 19 may write to the RAM 14 all cache data that is deleted from the cache 12 at the time of replacing cache data.

In the present embodiment, the RAM data determination bit table 15 is held in the RAM 14, but the RAM data determination bit table 15 may be held in any storage device other than the RAM 14.

The switching device 16 may be realized by allowing the CPU 11 to execute a program for allowing the CPU 11 to function as the switching device 16, or a part or all of the functions of the switching device 16 may be realized by hardware. The same applies to the cache controller 19.

While the invention has been described in detail, the foregoing description is in all aspects illustrative and not restrictive. It is understood that numerous other modifications and variations can be devised without departing from the scope of the invention.

What is claimed is:

1. An arithmetic unit with a reduced startup time having a CPU, a cache for storing cache data, a RAM, and a non-volatile memory, the arithmetic unit comprising:
   determination means for determining whether data to be read by the CPU is in the RAM;
   a switching device for allowing the CPU to read the data from the non-volatile memory without referring to the RAM, depending on a result of determination by the determination means; and
   a cache controller for setting, if the data is stored, without being copied to the RAM, in the cache as cache data from the non-volatile memory, all dirty bits of cache tags associated with the cache data to "dirty".

2. The arithmetic unit with a reduced startup time according to claim 1, wherein the determination means makes the determination by referring to a RAM data determination bit table which retains information concerning the presence or absence of data in the RAM.

3. The arithmetic unit with a reduced startup time according to claim 1, wherein the switching device has a function of determining, if the data is not in the RAM, an address in the non-volatile memory that corresponds to the data.

4. The arithmetic unit with a reduced startup time according to claim 1, wherein the cache controller has a function of writing, if the data is stored in the cache as cache data, to a cache tag associated with the cache data an address in the RAM that corresponds to the cache data.

5. The arithmetic unit with a reduced startup time according to claim 1, wherein the non-volatile memory is a ROM.

6. A method of loading data in an arithmetic unit having a CPU, a cache, a RAM, and a non-volatile memory, the method comprising:
   determining whether data to be read by the CPU is in the RAM;
   allowing the CPU to read the data from the non-volatile memory without referring to the RAM, depending on a result of the determination; and
   setting, if data is, without being copied to the RAM, stored in the cache as cache data from the non-volatile memory, all dirty bits of cache tags associated with the cache data to "dirty".

* * * * *